Sept. 11, 1956
H. OWENS ET AL
2,762,125
GEOMETRIC DEVELOPING INSTRUMENT
Filed Oct. 26, 1953
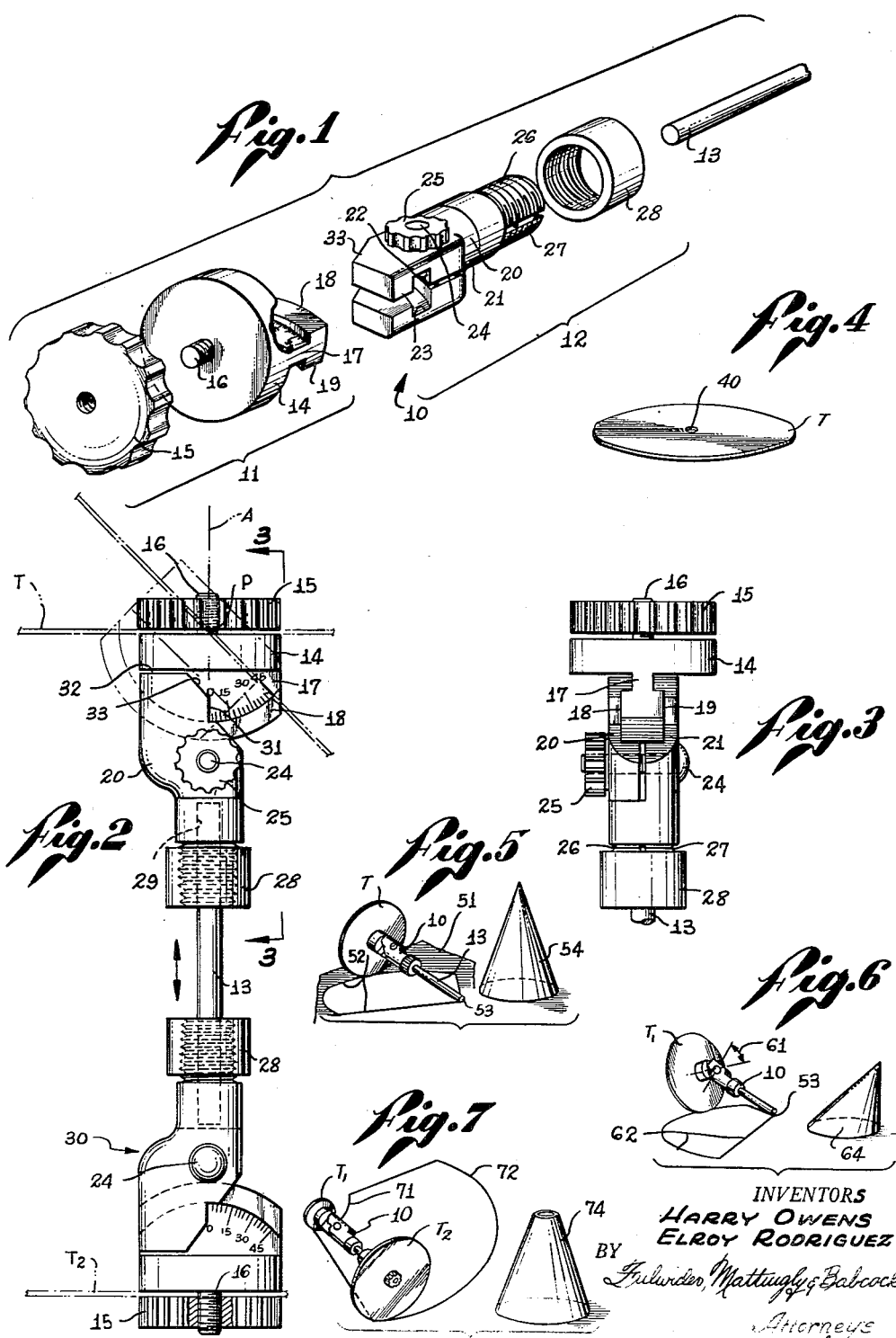
INVENTORS
HARRY OWENS
ELROY RODRIGUEZ
BY Fulwider, Mattingly & Babcock
Attorneys

United States Patent Office 2,762,125
Patented Sept. 11, 1956

2,762,125

GEOMETRIC DEVELOPING INSTRUMENT

Harry Owens and Eloy Rodriguez, Los Angeles, Calif.

Application October 26, 1953, Serial No. 388,097

4 Claims. (Cl. 33—26)

This invention relates to a geometric developing instrument, and more particularly, to a specially designed instrument for facilitating the fabrication of various three-dimensional geometric figures such as cones, cylinders, and the like. The invention has particular application in classroom instruction in solid geometry, enabling a pupil to construct readily and simply the more common forms of geometrical shapes by himself. Aside from its educational benefits, the instrument may also be used as a simple amusement device or toy, permitting the arbitrary formation of various geometrical patterns and shapes.

A specific object of the present invention is to provide an instrument for making highly accurate layout tracings which may be cut and formed into predetermined geometrical solids.

Another object is to provide an amusement device which is both highly entertaining and extremely educational.

Briefly, the geometric developing instrument of the present invention comprises a pair of head members supported in spaced relation by an extensible rod. This rod may be varied in length whereby the distance between the head members is adjustable. Each head member is provided with means for supporting a template element. The template element may comprise a plane geometric figure, such as a triangle, square, circle, or ellipse, for example. Several such template elements are provided with the instrument, and may be interchangeably secured to each head. Each of the head members also includes means for angulating the head and template elements with respect to the axis of the extensible rod. Suitable clamping means are provided for securing the template elements in any arbitrary angular position.

In use, template elements are secured to the heads and spaced apart a give distance by means of the extensible rod. The template elements are then angulated with respect to the axis of the rod to assume certain desired angles. The periphery of each template element is chalked with a suitable marking material whereby when the instrument is rolled one complete revolution along a sheet of paper, the template elements acting as "wheels," geometrical tracings are left on the sheet. The ends of the tracings are connected by straight lines and the resulting pattern cut from the sheet with scissors along these lines, and formed into a perfect geometrical solid. The particular geometrical solid formed will depend on the shape of the template elements employed, their separation, and their angular disposition with respect to each other.

A better understanding of the invention will be had by referring to a preferred embodiment thereof shown in the accompanying drawings, in which:

Figure 1 is an exploded, perspective view of one-half of the geometric developing instrument;

Figure 2 is a side elevational view of the entire instrument;

Figure 3 is a front view of the upper half of the instrument taken in the direction of the arrows 3—3 of Figure 2;

Figure 4 is a perspective view of one type of template element; and

Figures 5, 6, and 7 illustrate schematically various tracings which may be made by the instrument and the corresponding geometrical solids obtainable therefrom.

Referring to Figure 1, there is shown in exploded perspective view a portion of a preferred embodiment of the invention. This instrument, generally designated by the numeral 10, comprises a head portion 11, a shank portion 12, and an extensible rod 13. To the rod 13 there may be secured an additional shank portion and head portion to provide a pair of heads as shown in the elevational view of Figure 2. Each of the shank and head portions are identical in construction and description of one will therefore suffice for both.

As shown in Figure 1, the head member comprises a flat mounting plate or disc 14. The plate 14 is adapted to support a template element in cooperation with a clamping nut 15 threadedly securable to a projecting bolt 16 from the center of the plate 14. The template element T shown in Figure 4 but omitted from Figure 1 for purposes of clarity, is provided with an opening 40 at its geometrical center through which the bolt 16 passes.

Secured to the plate 14 is a projecting rocker piece 17 having an arcuate end surface provided with laterally projecting arcuate flanges 18 and 19. The center of the radius of curvature of the arcuate flanges 18 and 19 and the arcuate end surface is made to coincide with the geometrical center of the template element when it is clamped in position on the plate 14 by the clamping nut 15. The rocker piece 17 enables the head member 11 to be angulated with respect to the axis of the instrument, without the geometrical center of the template element moving off of the instrument axis.

This angulation is accomplished by slidingly supporting the rocker piece 17 on the shank portion 12 as follows: Shank portion 12 is comprised of mating side pieces 20 and 21 provided respectively with arcuate recesses or channels 22 and 23. The side pieces 20 and 21 are held in assembled relation by a bolt 24 and angle setting nut 25. When assembled in this manner, the recesses 22 and 23 form an arcuate channel having undercut side walls. The laterally projecting flanges 18 and 19 are adapted to ride in the undercut side wall portions 22 and 23, and be retained in any set angulated position by simply tightening the nut 25 to clamp the side pieces 20 and 21 together.

The shank portion side pieces also include semi-cylindrical threaded elements 26 and 27, respectively, adapted to be threadedly received within a clamping collar 28. A semi-circular longitudinal bore in each side piece forms a central bore when the two pieces are assembled for receiving the extension rod 13. With this arrangement, the rod 13 may be inserted between the side pieces 20 and 21, and the tightening collar 28 threaded onto the semi-cylindrical threads 26 and 27 to cause the inner surfaces of these threaded portions to engage the extensible rod.

As shown clearly in Figure 2, the complete instrument includes an additional head and shank 30 identical in construction to the head and shank 10, and adapted to be secured to the other end of the extensible rod 13. The bore 29 in the lower portion of the shank is made to extend a sufficient distance into the shank to permit a considerable variation in the spacing between the two heads. In forming certain types of geometrical patterns, as will become clear as the description proceeds, the head portion and shank 30 may be entirely removed, and only the rod 13 and portion 10 of the instrument employed.

The rocker piece 17 is preferably provided with indexing marks and suitable numerals indicating angles in degrees, as shown. A vertical edge 31 on the side piece of the shank may be employed as a reference point, this vertical edge 31 lying in the plane of the axis A of the instrument and of the extensible rod 13.

As shown in the full line position of Figure 2, the head clamping members 14 and 15 support a template element T in a horizontal plane normal to the axis A of the instrument. In the phantom line position, the head and template element T are shown inclined to the axis A at an angle which is indicated by referring to the vertical reference edge 31 and the corresponding indexing line on the rocker piece thereunder. It will be noted that the geometrical center P of the template element is still on the axis A when the element is angulated.

Each of the side plates 20 and 21 is preferably provided with a flat, horizontal upper end surface 32 adapted to engage the underside of the plate 14 when the head and template element T are positioned in their normal horizontal position. These side plates may additionally include beveled surfaces 33 for engaging the underside of the plate 14 to check their extreme angulated positions, as shown in phantom lines. Figure 3 shows the front of the instrument portion 10 as viewed in the direction of the arrows 3—3.

It is thus seen that the present instrument provides in effect a pair of head members which may be separated an adjustable distance and retained in such separated distance, each of the head members being capable of angular orientation with respect to a straight line passing through the head members. The rocker piece construction and arcuate-receiving channel construction is an extremely important feature of the present invention, since it permits the head members and template plates to be angulated with the instrument axis still passing through their geometric centers. It is as though the head members were pivoted at the point P to the shank portion. Thus the angular scale on rocker piece 17 correctly indicates the angle of the intersection between the templates and the axis of the solid generated by the use of the device. If this situation did not obtain it would be necessary to calculate the angle to be set on the rocker piece for each specific figure which it is desired to create, in accordance with the linear offset of point P from the axis and the axial length of the solid to be generated. Such a computation would, of course, greatly complicate the use of the instrument and impair its efficiency for teaching purposes.

Figure 4 illustrates in perspective a typical template element T. As shown, this element is provided at its geometrical center with an opening 40 adapted to receive the shank portion of the bolt 16 as described in connection with Figure 1.

Referring to Figures 5, 6, and 7, the operation of the instrument will now be described.

As a first example, assume it is desired to form a right circular cone. In making use of the instrument for this purpose, one of the heads, such as the head 30, is removed, and the distance from the end of the exposed rod 13 to the geometrical center point P of the template element T is adjusted to equal the altitude of the cone. A suitable circular template element having a diameter corresponding to the desired diameter for the base of the cone is then selected and inserted between the supporting plate 14 and clamping nut 15. Since the cone is to be a right circular cone, the angular orientation of the normal to the template element T with respect to the axis is made 0°, as shown by a reading of 0° on the indexing scale on the rocker piece 17.

The peripheral edge of the template element T is chalked with a suitable material and the instrument then laid upon a sheet of drafing paper for example, such as the sheet 51 shown in Figure 5. The template element T is then rolled on the sheet for one complete revolution, leaving a trace 52, the far end of the extension rod 13 being held at one point, as at 53. Chords from the ends of the tracing 52 are then drawn to the point 53 to result in an outline defining the material for making the solid cone. The enclosed figure in the outline 52 is then cut from the paper 51 by scissors and a cone 54 easily fabricated.

If it were desired to form a cone having a lateral edge normal to the base, the head member of the instrument 10 is angulated with respect to the instrument axis A, at the angle 61, as shown in Figure 6. A tracing is then effected as shown at 62 by rolling the template element T1 one complete revolution on the drafting paper. As in the case of Figure 5, the ends of the tracing 62 are then connected with the center point 53 and the outline cut out from the drafting paper to form a cone 64. The angle of the apex of the cone 64 corresponds to the angle 61 to which the edge portion of the instrument is angulated with respect to the instrument axis.

Figure 7 illustrates a further example of the use of the instrument. In this instance, both head portions are employed and in the particular example chosen, it is assumed that a truncated cone is desired. To form this figure, two template elements of circular shape, each having a diameter corresponding to the diameter of the base of the cone and the diameter of the truncated portion are secured respectively to the heads of the instrument. As before, the periphery of the template elements are suitably chalked whereby when the instrument is rolled along a tracing paper, suitable traces 71 and 72 are left. As before, the instrument is rotated through exactly one revolution. The ends of the tracings 71 and 72 are then connected by straight lines, and the completed outline cut from the drafting paper. This cutout portion is then folded to form a perfect solid truncated cone, such as shown at 74 in Figure 7.

It is to be understood that a variety of differently shaped template elements may be provided with the instrument. For example, a square or triangular template element may be employed to provide proper tracings for prisms, for example. Also a square or triangular template may be used on one head while a circular template element is used on the other to provide a solid geometrical figure having a square cross-section at one end, gradually merging into a circular cross-section at the other.

Other uses of the instrument of the present invention for educational purposes, as well as amusement purposes, will occur to those skilled in the art. The precise form of the instrument illustrated and described and the specific examples chosen for illustrating its operation, are therefore not to be thought of as limiting.

We claim:

1. A geometric developing instrument comprising: a head; clamping means on said head for supporting a flat template in abutting relationship to an end surface thereof; a rocker piece projecting from the other end of said head and having an arcuate end surface the center of the radius of curvature of which coincides with the geometrical center of the opposite end surface of said head; and laterally projecting side flanges formed along said arcuate end surface; a shank having a recessed arcuate channel with laterally undercut walls for receiving said arcuate end surface and side flanges in interlocking slidable relationship whereby said rocker piece may be angulated with respect to said shank; clamping means on said shank for holding said rocker piece in a given angulated position with respect to said shank; and a rod secured in said shank and extending therefrom along an axis passing through the geometric center of said head in both normal and angulated positions thereof.

2. A geometric developing instrument comprising: a head; clamping means on said head for supporting a flat template in abutting relationship to an end surface thereof; a rocker piece projecting from the other end of said head and having an arcuate end surface the center of the radius of curvature of which coincides with the geometrical center of the opposite end surface of said head, and laterally projecting side flanges formed along said arcuate end surface; a shank having longitudinally split end portions, one of said end portions having a recessed arcuate channel with laterally undercut walls for receiving said arcuate end surface and side flanges in interlocking slidable relationship whereby said rocker piece may be angulated with respect to said shank, the other end portion having an elongated bore lying on an axis passing through the geometrical center of said head in both normal and angulated positions thereof; a rod fitted into and longitudinally adjustable in said bore; and clamping means at both ends of said shank for holding said rocker piece in a given angulated position with respect to said shank, and said rod in a given longitudinal position with respect to sad shank.

3. A geometric developing instrument comprising: a pair of heads; a clamping means on each of said heads for supporting a flat template in abutting relationship to an end surface thereof; a rocker piece on each of said heads projecting from the end opposite to said template and having an arcuate end surface the center of the radius of curvature of which coincides with the geometriric center of the opposite end surface of said heads, and laterally projecting side flanges formed along said arcuate end surface; a shank engaged with each of said rocker pieces and having a recessed arcuate channel with laterally undercut walls for receiving said arcuate end surface and side flanges in interlocking slidable relationship whereby said rocker piece may be angulated with respect to said shank; clamping means on said shank for holding said rocker piece in a given angulated position with respect to said shank; and a rod extending between and secured in said shanks along an axis passing through the geometric centers of said heads in both normal and angulated positions thereof.

4. A geometrical developing instrument comprising: a pair of heads; clamping means on each of said heads for supporting a flat template in abutting relationship to an end surface thereof; a rocker piece on each of said heads projecting from the end opposite to said template and having an arcuate end surface the center of the radius of curvature of which coincides with the geometrical center of the opposite end surface of said heads, and laterally projecting side flanges formed along said arcuate end surface; a shank engaged with each of said rocker pieces and having longitudinally split end portions, one of said end portions having a recessed arcuate channel with laterally undercut walls for receiving said arcuate end surfaces and side flanges in interlocking slidable relationship whereby said rocker piece may be angulated with respect to said shank, the other end portion having an elongated bore lying on an axis passing through the geometrical center of said head in both normal and angulated positions thereof; a rod extended between and fitted into said bores for longitudinal adjustment of said heads; and clamping means at both ends of said shanks for holding said rocker pieces in a given position with respect to said shanks, and said rod in a given longitudinal position with respect to said shanks.

References Cited in the file of this patent
UNITED STATES PATENTS

| | | |
|---|---|---|
| 245,596 | Woessner et al. | Aug. 9, 1881 |
| 1,482,186 | Fales | Jan. 29, 1924 |
| 2,095,479 | Ridgeway | Oct. 12, 1937 |
| 2,431,100 | Woods | Nov. 18, 1947 |
| 2,585,135 | Klakovich | Feb. 12, 1952 |
| 2,624,944 | Pujda | Jan. 13, 1953 |